(12) United States Patent
Hsu

(10) Patent No.: US 7,120,028 B2
(45) Date of Patent: Oct. 10, 2006

(54) FASTENING MECHANISM FOR REAR PANEL OF COMPUTER

(75) Inventor: Hsin-An Hsu, Taipei (TW)

(73) Assignee: First International Computer, Inc., Taipei (TW)

( * ) Notice: Subject to any disclaimer, the term of this patent is extended or adjusted under 35 U.S.C. 154(b) by 279 days.

(21) Appl. No.: 10/307,364

(22) Filed: Dec. 2, 2002

(65) Prior Publication Data

US 2003/0103326 A1 Jun. 5, 2003

(30) Foreign Application Priority Data

Dec. 4, 2001 (TW) .................................... 90221071 U

(51) Int. Cl.
*G06F 1/16* (2006.01)

(52) U.S. Cl. .................... 361/726; 361/685; 312/223.1; 360/137; 248/552

(58) Field of Classification Search ......... 361/684–687, 361/724–727; 369/75.1; 312/223.1–223; 174/52.1, 66; 360/97.02, 137; 211/26, 41; 248/552–553

See application file for complete search history.

(56) References Cited

U.S. PATENT DOCUMENTS

| 5,600,539 | A | * | 2/1997 | Heys et al. | 361/684 |
| 5,627,731 | A | * | 5/1997 | Sato et al. | 361/796 |
| 6,182,835 | B1 | * | 2/2001 | Chen | 211/13.1 |
| 6,351,375 | B1 | * | 2/2002 | Hsieh et al. | 361/685 |
| 6,549,398 | B1 | * | 4/2003 | Chen | 361/683 |
| 6,597,569 | B1 | * | 7/2003 | Unrein | 361/687 |

* cited by examiner

*Primary Examiner*—Hung Van Duong
(74) *Attorney, Agent, or Firm*—Troxell Law Office, PLLC

(57) ABSTRACT

The present invention is to provide a mechanism for fastening a rear side of computer comprising a rear panel provided at the rear of a case of the computer, and a fastening assembly having one end pivotably connected to the case adjacent the rear panel for pivoting the fastening assembly to approach or move away from the rear panel, wherein, after a plurality of fastening members being mounted at the rear panel, the fastening assembly is able to tightly press the fastening members thereby sandwiching an engagement piece of each fastening member between the fastening assembly and the rear panel and quickly fastening the fastening members at the rear panel.

11 Claims, 4 Drawing Sheets

FASTENING MECHANISM FOR REAR PANEL OF COMPUTER

FIELD OF THE INVENTION

The present invention relates to fastening mechanisms for computer components and more particularly to an improved mechanism for fastening a rear panel of computer and expansion cards within the computer.

BACKGROUND OF THE INVENTION

Information and electronic technologies have known a rapid, spectacular development leading to an increasing use of electronic and telecommunication products. A variety of quality high technology products such as computers, cellular phones, etc. are continuously commercially available. Such products not only bring a great convenience to our daily life but also shorten distances between people both in space and time. For example, with respect to personal computers (PCs) more advanced models are developed in order to keep pace with the rapidly increasing demand of vast consumers. In this regard, we can know a relative development level of high technology products of a certain country with respect to other countries by determining whether, for example, the produced computers thereof are able to provide a more convenient, effective service to the people of that country.

As known that an expansion slot on a mainboard of a computer is able to connect to one of a variety of expansion cards. The expansion slot may be one of types such as AGP, PCI, ISA, CNR, or AMR. Conventionally, there are more than five PCI slots provided on an ATX mainboard. Also, the more of the number of the expansion slots the higher of the expansion capability of the computer. As such, almost all major mainboard manufactures endeavor to research and develop improved expansion cards and expansion slots for meeting the needs of vast consumers. However, improvement about fastening of the expansion cards is rare.

A typical fastening mechanism for a rear panel of computer is shown in FIG. 1. As shown, a plurality of screws are used to fasten the expansion card. In detail, a mainboard is provided on the bottom of a computer case 2. A plurality of expansion slots 7 are formed on the mainboard. Each expansion slot 7 is able to connect to an inserted expansion card 5. The expansion card 5 comprises a circuit board having a bracket 50 at one end of the circuit board. At least one connector is formed on the bracket 50 at a surface opposite to the circuit board. One end of the bracket 50 is bent to form an engagement piece 501. A hole is formed at the engagement piece 501. An access port cover 8 is provided at each opening at the rear panel associated with the empty expansion slot (i.e., no expansion card 5 insertion therein) 7. Also, a hole is formed at one end of the access port cover 8.

Moreover, a rear panel 3 is provided at the rear side of the case 2 and is disposed corresponding to the expansion slots 7. A plurality of openings 32 are formed on the rear panel 3 and are also disposed corresponding to the expansion slots 7. A threaded hole 33 is formed between one ends of any two adjacent openings 32. The bracket 50 of one expansion card 5 inserted in the expansion slot 7 may engage with the opening 32 at the rear panel 3. Also, the connector is exposed from the case 2 and the engagement piece 501 of the bracket 50 is rested on one side of the rear panel 3. Hence, a plurality of screws 34 may be used to drive through the holes and the threaded holes 33 to secure the brackets 50 to the rear panel 3 and secure the access port covers 8 to the rear panel 3 respectively. As a result, both the expansion cards 5 and the access port covers 8 are reliably mounted on the mainboard.

However, the prior art fastening mechanism for the expansion cards (particularly the above screw threading technique) is disadvantageous due to time-consuming, labor intensive, and inconvenient to user. Thus, users may be frustrated by the tedious expansion card installation procedure if no other effective techniques are employed to eliminate the above disadvantages associated with either insertion or removal of the expansion card. To the worse, users may be reluctant to install the expansion card. Accordingly, a major blow to the expansion card market is foreseeable. In another aspect, companies engaged in high technology product production must not only provide quality goods for meeting the needs of computer assembly DIY (Do-It-Yourself) but also increase an assembly speed of computers at the assembly line. Particularly, the installation of expansion cards is key to an increase of the assembly speed of computers. Thus, continuing improvements in this field are constantly being sought.

SUMMARY OF THE INVENTION

A primary object of the present invention is to provide a mechanism for fastening a rear side of computer comprising a rear panel provided at the rear of a case of the computer, and a fastening assembly having one end pivotably connected to the case adjacent the rear panel for pivoting the fastening assembly to approach or move away from the rear panel. It is possible of tightly pressing a plurality of fastening members by the fastening assembly after the fastening members have been mounted at the rear panel, thereby sandwiching each engagement piece formed at one end of the fastening member between the fastening assembly and the rear panel and quickly fastening the fastening members at the rear panel. By utilizing this fastening mechanism, it is possible of overcoming the above drawbacks such as time-consuming, labor intensive, inconvenient, and tedious installation procedure of the prior art.

The above and other objects, features and advantages of the present invention will become apparent from the following detailed description taken with the accompanying drawings.

DETAILED DESCRIPTION OF THE PREFERRED EMBODIMENTS

Figure 1:
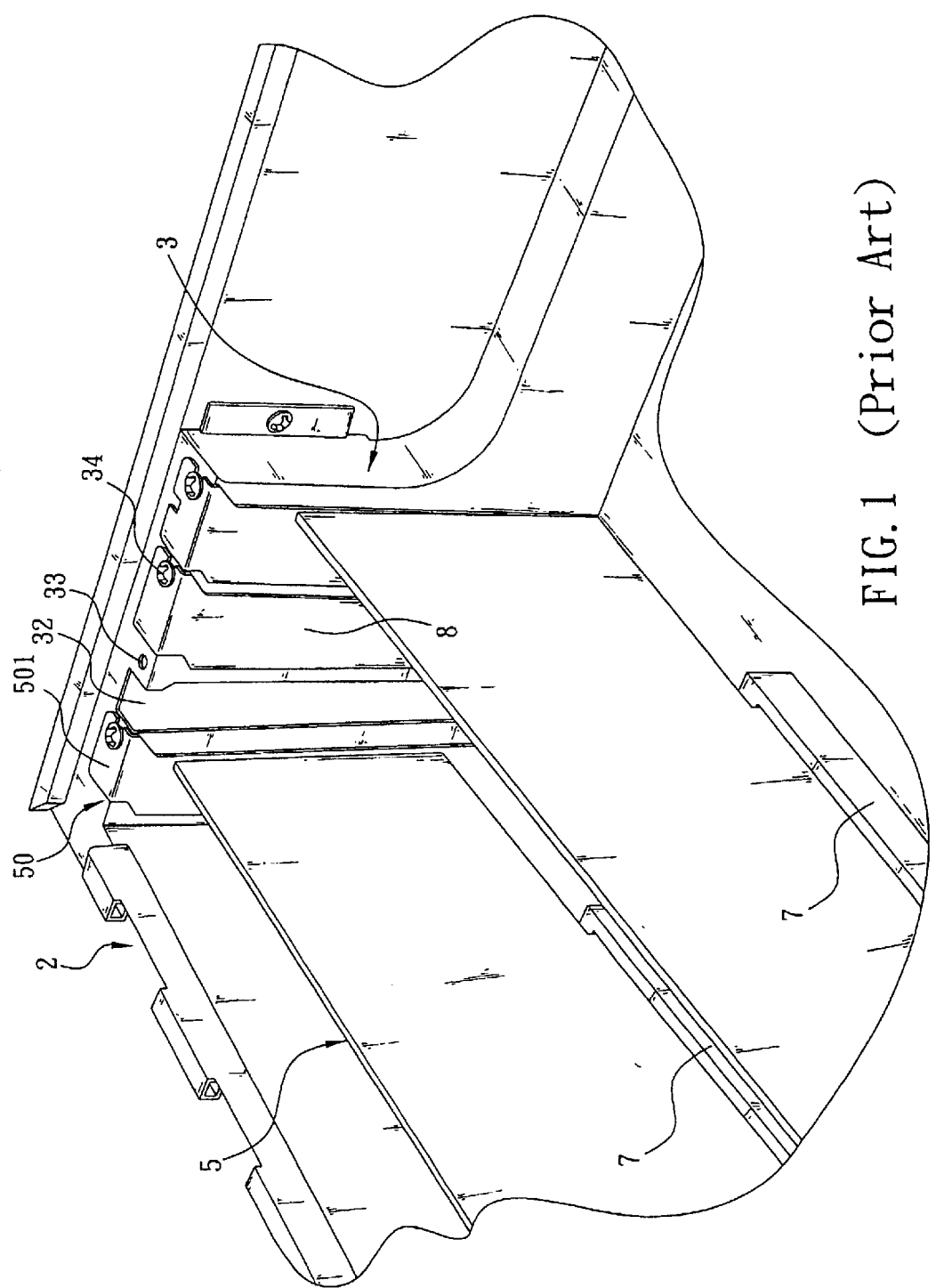
FIG. 1 is a perspective view showing a number of expansion cards mounted at expansion slots on a mainboard of computer by means of a conventional fastening mechanism.
Figure 2:
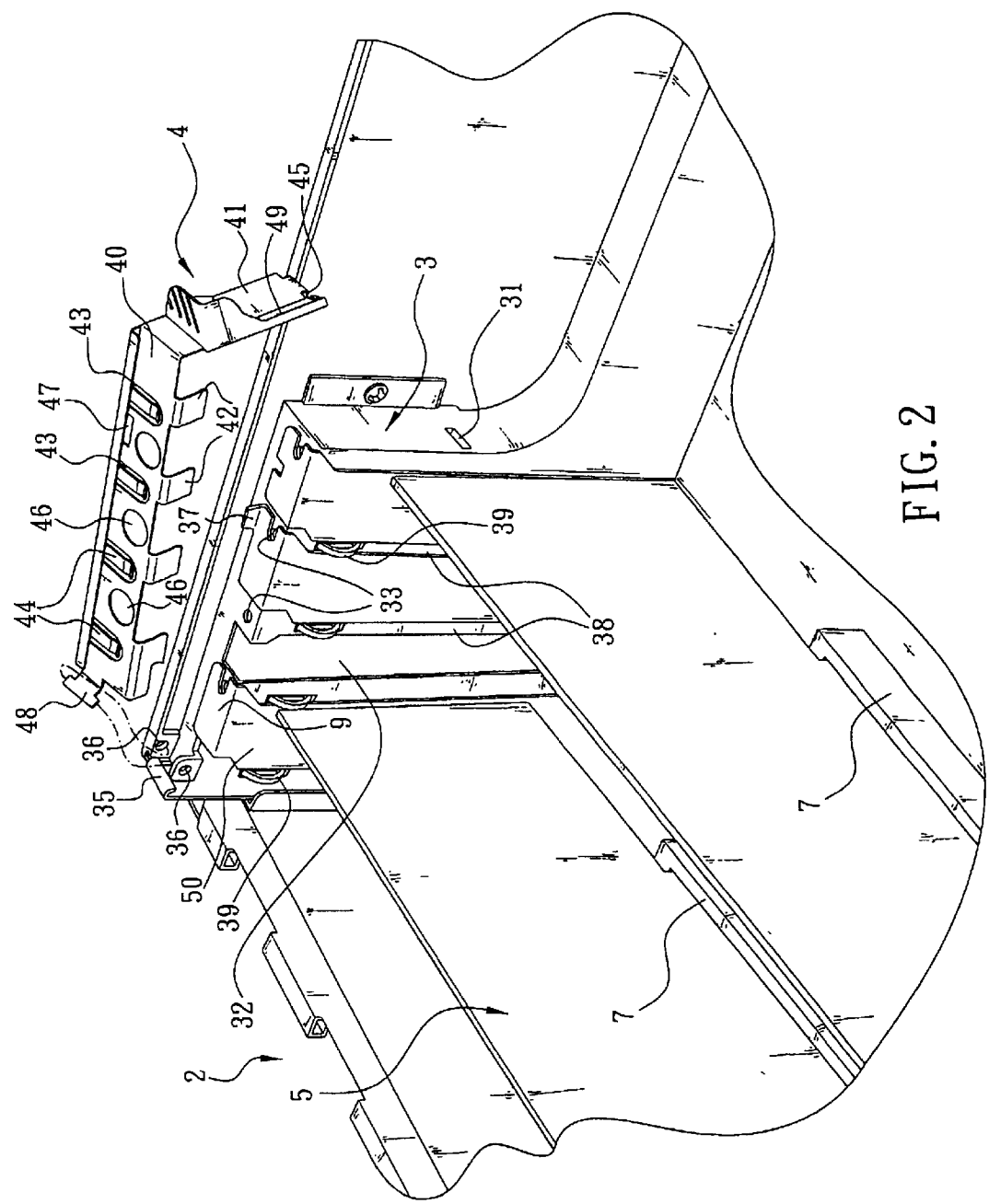
FIG. 2 is an exploded perspective view showing a fastening mechanism according to the invention prior to being secured to a plurality of expansion cards mounted at expansion slots on a mainboard of computer.
Figure 3:
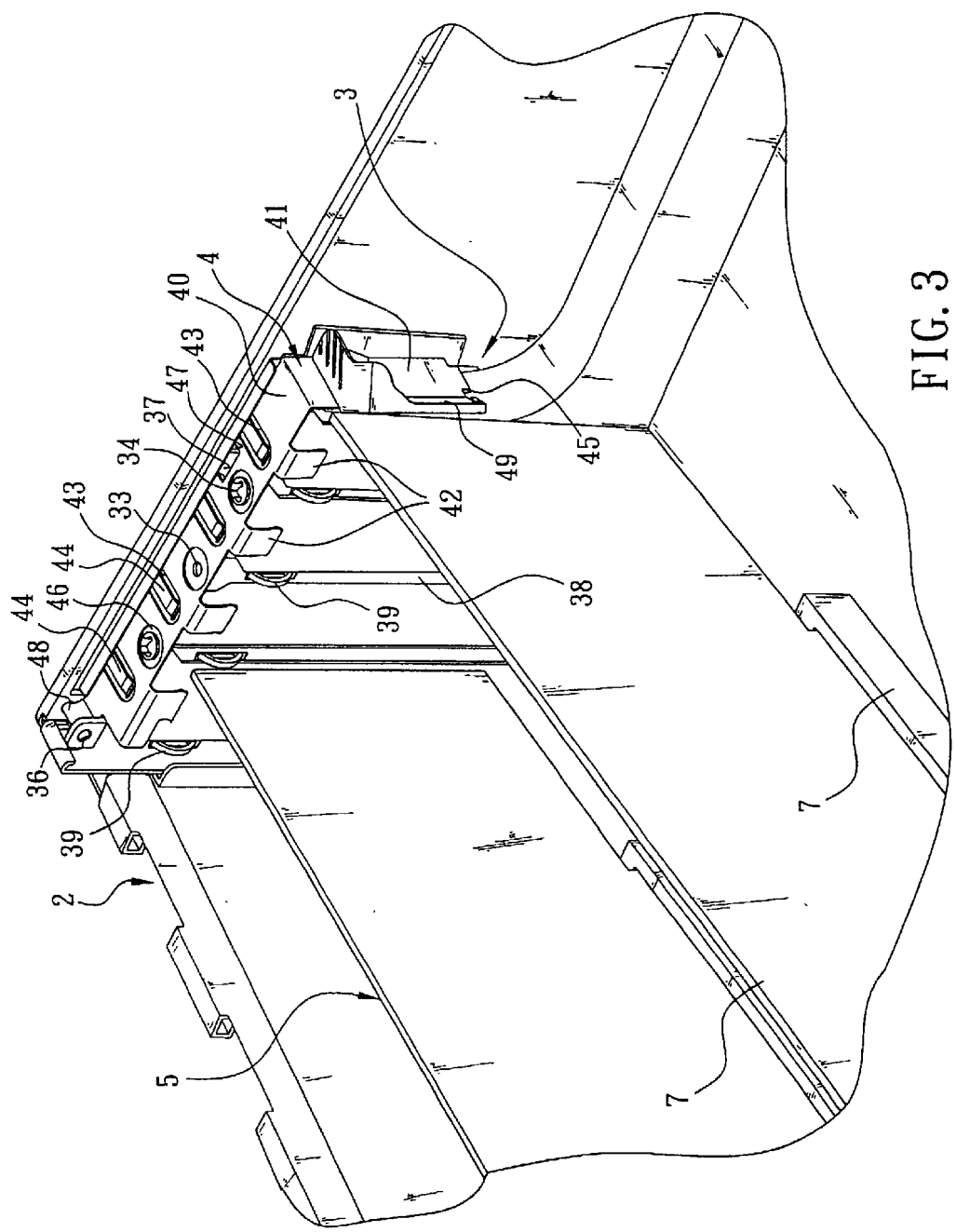
FIG. 3 is a perspective view showing the fastening mechanism secured to the expansion cards.
Figure 4:
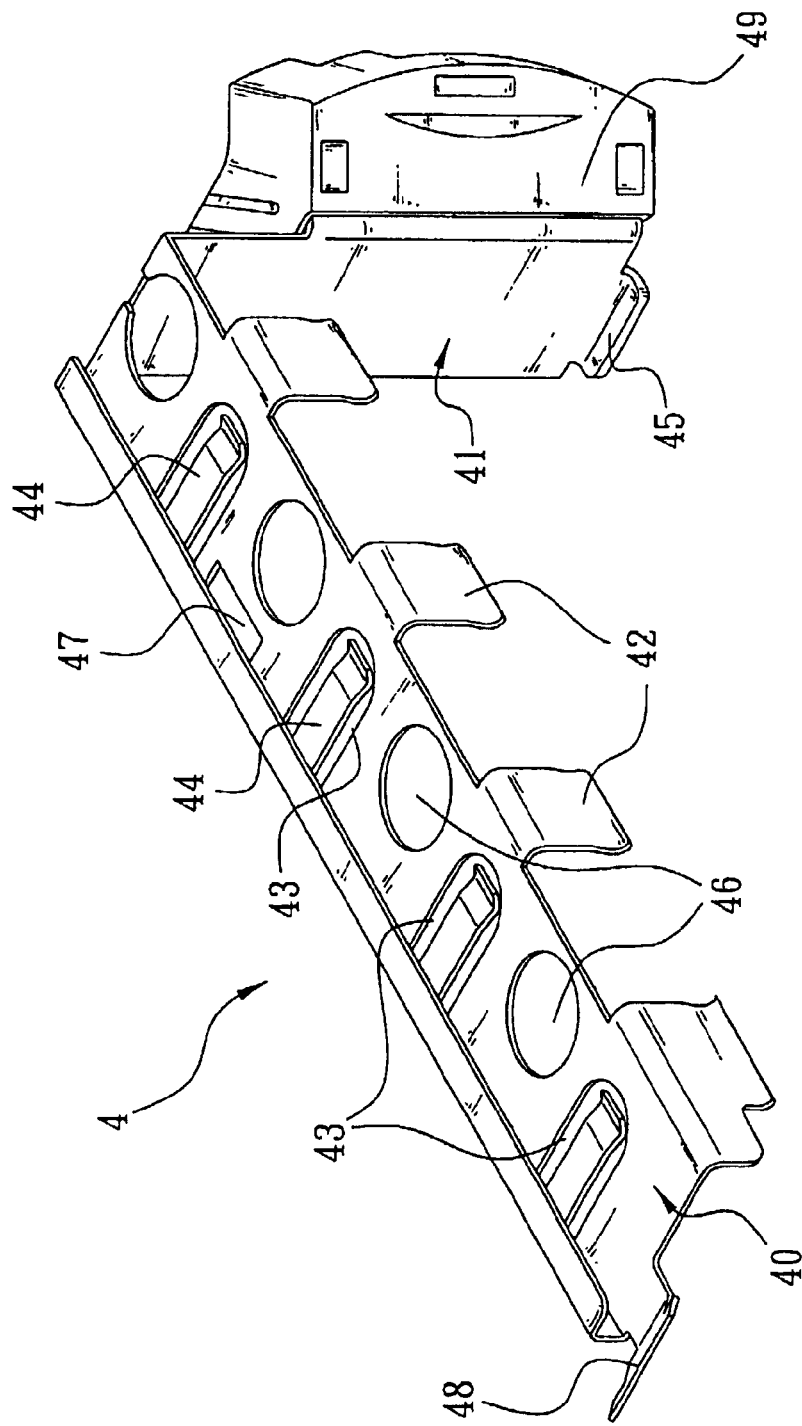
FIG. 4 is a perspective view of fastening assembly of the fastening mechanism.

Referring to FIGS. 2, 3, and 4, there are shown a fastening mechanism for a rear panel 3 in accordance with the invention. The rear panel 3 is provided at the rear side of a computer case 2 and is disposed corresponding to a plurality of expansion slots 7 within the case 2. A plurality of openings 32 are formed on the rear panel 3 and are also disposed corresponding to the expansion slots 7. A fastening member such as the bracket 50 of an expansion card 5 or an access port cover 8 can be fastened to the opening 32. The rear panel 3, the expansion cards 5, and the access port covers 8 are well known. One end of the fastening member is bent to form an engagement piece 9. The engagement piece 9 is rested on one side of the rear panel 3 after the fastening members have been mounted at the openings 32.

The fastening mechanism comprises a fastening assembly 4 having one end pivotably connected to the case 2 adjacent the rear panel 3. As such, the fastening assembly 4 is able to pivot to approach or move away from the top of the rear panel 3. At least one snapping element (e.g., guide) 45 is formed on the fastening assembly 4. The snapping element 45 is able to contact the rear panel 3. A mating snapping element (e.g., slot) 31 is formed on the rear panel 3. The mating snapping element 31 is disposed corresponding to the snapping element 45. As such, it is possible of tightly pressing the fastening members by the fastening assembly 4 after the fastening members have been mounted at the rear panel 3. As a result, the engagement pieces 9 are sandwiched between the fastening assembly 4 and the rear panel 3 with the snapping element 45 in the mating snapping element 31 for securely engagement. As an end, the fastening members are fastened at the rear panel 3.

Referring to FIGS. 2, 3, and 4 again, in the invention the fastening assembly 4 has an L shape and comprises a horizontal pressing section 40 and a vertical snapping section 41. A plurality of spaced tabs 42 are projected from the inner side of the pressing section 40 and are perpendicular to the pressing section 40. Further, the tabs 42 are disposed corresponding to the openings 32. As such, the fastening members can be stopped by the tabs 42 after the fastening members have been mounted at the rear panel 3 and fastened by the fastening assembly 4. This can further enhance the fastening.

Referring to FIGS. 2, 3, and 4 again, in the invention the pressing section 40 further comprises a plurality of U-shaped apertures 43 which are disposed corresponding to the openings 32. A flexible piece 44 is provided in each U-shaped aperture 43 and is raised slightly. In detail, the flexible piece 44 is extended from one distal end of the opening 32 toward the opening 32. A downwardly projected portion is formed at the flexible piece 44 adjacent one end of the opening 32. As such, the fastening members can be tightly pressed by the flexible pieces 44 after the fastening members have been mounted at the rear panel 3 and fastened by the fastening assembly 4. This still can further enhance the fastening.

Referring to FIGS. 2, 3, and 4 again, in the invention an elongated plate 38 is formed between any two adjacent openings 32. A raised positioning projection 39 is formed in each plate 38. The positioning projection 39 is able to fasten each fastening member between two adjacent plates 38 after the fastening members have been mounted at the rear panel 3. As such, in addition to the fastening of the fastening members by the fastening assembly 4, the fastening members can also be secured by the positioning projections 39. As a result, the positioning projections 39 are fastened at corresponding positions of the openings 32.

Referring to FIGS. 2, 3, and 4 again, in the invention a plurality of threaded holes 33 are formed at one ends of the rear panel 3 being in contact with the fastening assembly 4. Hence, it is possible of fastening the fastening members at the rear panel 3 by driving a plurality of screws 34 through the threaded holes 33. This safe arrangement can prevent fastening of the fastening members by the rear panel 3 from being totally compromised in case of a malfunctioning of the fastening assembly 4.

Referring to FIGS. 2, 3, and 4 again, in the invention the fastening assembly 4 further comprises a plurality of circular holes 46 each corresponding to the threaded hole 33. As such, the heads of the screws 34 are projected above the circular holes 46 after the fastening members have been threadedly secured to the rear panel 3 and fastened by the fastening assembly 4. As a result, the fastening assembly 4 can be rested on the rear panel 3. Also, the shanks of the screws 34 can be either driven into the threaded holes 33 through the circular holes 46 or unscrewed from the threaded holes 33.

Referring to FIGS. 2, 3, and 4 again, in the invention the pressing section 40 further comprises at least one rectangular opening 47 for positioning. Correspondingly, at least one riser 37 is formed at one side of the rear panel 3 to be contacted with the pressing section 40. The riser 37 is matingly engaged with the rectangular opening 47 for positioning so as to fasten the fastening assembly 4 after the pressing section 40 has been fastened at the rear panel 3. As a result, the fastening assembly 4 is secured in place.

Referring to FIGS. 2, 3, and 4 again, in the invention the pressing section 40 further comprises a T-shaped member 48 projected from the open end distal from the snapping section 41. Correspondingly, a U-shaped support 35, having two opposite holes 36 at both sides, is formed on the case 2. The T-shaped member 48 is fastened between the holes 36 of the support 35. As a result, the fastening assembly 4 is facilitated to pivot to approach or move away from the top of the rear panel 3.

Referring to FIGS. 2, 3, and 4 again, in the invention the snapping section 41 comprises an arcuate protuberance 49 at one side. As such, a user can apply force on the protuberance 49 to pivot the fastening assembly 4. Preferably, a soft plastic member is wrapped around the protuberance 49.

While the invention has been described by means of specific embodiments, numerous modifications and variations could be made thereto by those skilled in the art without departing from the scope and spirit of the invention set forth in the claims.

What is claimed is:

1. A mechanism for fastening a rear side of a computer comprising:

a rear panel provided at the rear of a case of the computer and disposed corresponding to a plurality of expansion slots within the case, the rear panel comprising a plurality of openings disposed corresponding to the expansion slots;

a plurality of fastening members fastened at the openings, each of the fastening members having an engagement piece at one end, the engagement piece being rested on one side of the rear panel after the fastening members have been mounted at the openings; and a fastening assembly having one end pivotably connected to the case adjacent the rear panel for pivoting the fastening assembly to approach or move away from the rear panel, the fastening assembly comprising at least one snapping element being in contact with the rear panel, the snapping element being matingly, securely engaged with a mating snapping element at the rear panel so as to tightly press the fastening members by the fastening assembly after the fastening members have been mounted at the rear panel, thereby sandwiching the engagement pieces between the fastening assembly and the rear panel and fastening the fastening members at the rear panel, wherein the fastening assembly is shaped as an L and comprises a horizontal pressing section and a vertical snapping section, wherein the pressing section further comprises a plurality of U-shaped apertures disposed corresponding to the openings, a plurality of flexible pieces each provided in the U-shaped aperture, each of the flexible pieces being extended from one distal end of the opening toward the opening, a plurality of downwardly projected portions each provided at the flexible piece adjacent one end of the opening so that the fastening members are operative to be tightly pressed by the flexible pieces after the fastening members have been mounted at the rear panel and fastened by the fastening assembly for fastening enhancement.

2. The mechanism of claim 1, wherein the pressing section comprises a plurality of spaced tabs projected from the inner side thereof, the tabs being perpendicular to the pressing section and disposed corresponding to the openings so that the fastening members are operative to be stopped by the tabs after the fastening members have been mounted at the rear panel and fastened by the fastening assembly for fastening enhancement.

3. The mechanism of claim 1, further comprising an elongated plate between any two adjacent openings, a raised positioning projection provided in each of the plates, the positioning projection being capable of fastening each of the fastening members between two adjacent plates after the fastening members have been mounted at the rear panel so that in addition to the fastening of the fastening members by the fastening assembly, the fastening members are also secured by the positioning projections which are in turn fastened at corresponding positions of the openings.

4. The mechanism of claim 1, wherein the rear panel further comprises a plurality of threaded holes at one ends thereof being in contact with the fastening assembly so that it is possible of fastening the fastening members at the rear panel by driving a plurality of screws through the threaded holes.

5. The mechanism of claim 1, wherein the pressing section further comprises at least one rectangular opening for positioning and the rear panel further comprises at least one riser at one side to be contacted with the pressing section, the riser being matingly engaged with the rectangular opening for positioning so as to fasten the fastening assembly after the pressing section has been fastened at the rear panel.

6. The mechanism of claim 1, wherein the pressing section further comprises a T-shaped member projected from its open end distal from the snapping section and the case comprises a U-shaped support having two opposite holes at both sides, the T-shaped member being fastened between the holes of the support so as to facilitate a pivoting of the fastening assembly to approach or move away from the rear panel.

7. The mechanism of claim 1, wherein the snapping section comprises an arcuate protuberance at one side, the protuberance being served as a point for exerting force to pivot the fastening assembly.

8. The mechanism of claim 1, wherein each of the fastening members is a bracket of an expansion card.

9. The mechanism of claim 1, wherein each of the fastening members is an access port cover.

10. The mechanism of claim 4, wherein the fastening assembly further comprises a plurality of circular holes each disposed corresponding to the threaded hole so that the heads of the screws are projected above the circular holes after the fastening members have been threadedly secured to the rear panel and fastened by the fastening assembly, the fastening assembly are operative to be rested on the rear panel, and the shanks of the screws are operative to be either driven into the threaded holes through the circular holes or unscrewed from the threaded holes.

11. The mechanism of claim 7, further comprising a soft plastic member wrapped around the protuberance.

\* \* \* \* \*